United States Patent [19]

Terasawa et al.

[11] 4,403,233

[45] Sep. 6, 1983

[54] INK JET APPARATUS

[75] Inventors: Koji Terasawa, Mitaka; Shigemitsu Tazaki, Matsudo; Shigeru Okamura, Yokohama, all of Japan

[73] Assignee: Canon Kabushiki Kaisha, Tokyo, Japan

[21] Appl. No.: 339,519

[22] Filed: Jan. 15, 1982

[30] Foreign Application Priority Data

Feb. 6, 1981 [JP] Japan .................................. 56-5601

[51] Int. Cl.[3] ............................................ G01D 15/18

[52] U.S. Cl. ............................................... 346/140 R

[58] Field of Search .......................... 346/1.1, 75, 140

[56] References Cited

U.S. PATENT DOCUMENTS 4,024,544 5/1977 Vernon .............................. 346/1.1

4,123,761 10/1978 Kimura et al. ............... 346/140 PD 4,231,046 10/1980 Aiba ...................................... 346/75

*Primary Examiner*—Donald A. Griffin

*Attorney, Agent, or Firm*—Fitzpatrick, Cella, Harper & Scinto

[57] ABSTRACT

An ink jet apparatus comprises an ink jet nozzle, a cap capable of fitting said ink jet nozzle, and a suction means for supplying negative pressure to the ink jet nozzle and a ink-storage vessel in communication with said ink jet nozzle, characterized in that the suction means is provided with at least two independent suction chambers, with at least one of the suction chambers being in communication with the ink-storage vessel, and with at least the other suction chamber being in communication with the cap.

4 Claims, 5 Drawing Figures

INK JET APPARATUS

BACKGROUND OF THE INVENTION

1. Field of the Invention

The present invention relates to an ink jet apparatus used for a printer and the like and, more particularly, to an ink jet apparatus which is constructed in such a way that an otherwise poor discharge in a nozzle for ink jet can be improved by suction.

2. Description of the Prior Art

An ink jet printer provided with an ink jet apparatus discharges an ink or liquid or liquid-droplets to print dots on a printing paper for formation of a letter, character, figure, image, and the like. Therefore, the ink jet printer is provided with an ink tank and the like.

Consequently, portable compact electronic apparatuses which have such an ink jet printer have various problems different from electronic apparatuses, such as data-terminal and the like, which are hardly transported. For example, poor discharge of ink is caused by retrogradation of meniscus of ink in a nozzle, invasion of air bubbles into the nozzle, fixation of ink, and the like due to impact or vibration on transportion of the portable apparatuses which have the ink jet printer inclined therein.

In case that an electronic apparatus loading an ink jet printer is left standing in a packing state or transported in unused state for a long period of time, solvents in an ink, such as water and the like, evaporate from the tubes for which supply the ink and the like. Therefore, continuous supply of the ink is obstructed by an increase of the volume of air within a system for supply of the ink. Accordingly, there is a risk of non-discharge of ink owing to consumption of only ink remaining in a sub-tank.

In order to dissolve the above-mentioned disadvantages, U.S. Patent No. 4,263,030/1981, German patent application No. 3119892.9, and the like have already proposed a process which prevents poor discharge of ink by suction due to negative pressure. FIGS. 1 and 2 illustrate such suction process. In FIGS. 1 and 2, a numeral 1 shows an ink jet nozzle unit whose the rear end is in communication with an ink in a sub-tank 2. The sub-tank 2 is connected with a bag-like main tank 5 through an ink-supplying port 3 by a tube 4.

An end of the sub-tank 2 is connected to a pump 8 for improvement of poor discharge as mentioned below by a tube 7 through a vent hole 6. In the path of the tube 7, a filter 9 is provided to limit a flow amount of the ink from the sub-tank 2.

On the tip of the nozzle unit 10 is mounted a removable cap capable of always closing the tip of the nozzle when the tip is not in use, protecting the nozzle, and preventing the nozzle from drying and preventing foreign matter from attaching. An end of a tube 11 is connected to the cap 10 and the other end of the tube 11 with the pump 8.

The pump 8 is provided with a piston 12 whose peripheral surface is closed by O-rings $O_1$. A rod 13 of the pump 8 is closed by an O-ring $O_2$.

In addition, the piston 12 is biased upwards by a spring 14. A discharge hole 15 is disposed in a portion of the piston 12. A valve 17 is mounted on the under end of the discharge hole and the upper end thereof is in communication with a suction chamber 16.

In the above-mentioned construction, the piston 12 is located at the upper limit by the spring 14 in the starting state of the pump 8 as shown in FIG. 1. Accordingly, the volume of the suction chamber 16 is minimum. When the piston 12 is moved downwards from the starting position and overcomes the force of the spring 14, the volume of the suction chamber 16 increases to cause negative pressure. The negative pressure is led to the sub-tank 2 and the nozzle unit 1 through tubes 7 and 11. At this time, the valve 17 is closed. FIG. 2 shows the above-mentioned state. When the negative pressure is caused as mentioned above, the pressure in the sub-tank 2 also lowers so that an ink is sucked from the main tank 5 and the ink in the nozzle unit 1 is sucked simultaneously. Consequently, discharge of ink can be recovered. Therefore, at the beginning of printing, inability of ink discharge does not occur and printing can immediately be started by carrying out the above-mentioned movement immediately before the beginning of the operation of the ink jet printer.

However, the above-mentioned apparatuses still have the following disadvantages. In other words, the side of the sub-tank 2 has sufficient negative pressure only when a level of the liquid exists in the vicinity of the vent hole 6 as the liquid level represented by $H_1$ in FIG. 1. When the liquid level lowers at a lower position than the ink-supplying port 3, the space in the sub-tank 2 is nearly equal to the maximum volume of the suction chamber 6 or more. Therefore, the ratio of change in the volume of the air in the side of the pump 8 is substantially reduced so that the negative pressure caused by the suction becomes near atmosphere. As the result, the ink can not be sufficiently sucked from the nozzle unit 1 so that poor discharge is not improved.

SUMMARY OF THE INVENTION

An object of the present invention is to overcome the above-mentioned drawbacks.

In particularly, another object of the present invention is to provide an ink jet printer capable of improving poor discharge of ink even when the amount of air in a sub-tank increases.

According to the present invention, there is provided an ink jet apparatus comprising an ink jet nozzle, a cap capable of fitting to the ink jet nozzle, and a suction means for supplying negative pressure to the ink jet nozzle and an ink-storage vessel in communication with the ink jet nozzle, characterized in that the suction means is provided with at least two independent suction chambers, with at least one of the suction chambers being in communication with the ink-storage vessel, and with at least the other suction chamber being in communication with the cap.

DESCRIPTION OF THE PREFERRED EMBODIMENTS

The present invention will be illustrated by reference to the drawings.

Figure 1:
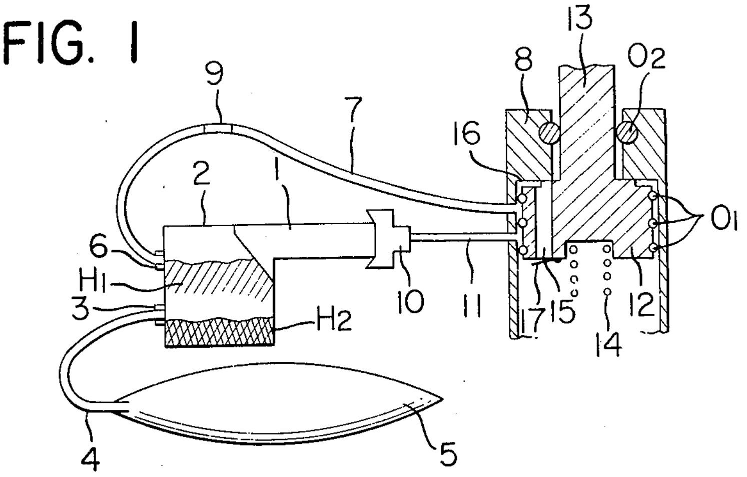
FIGS. 1 and 2 each are vertical side views illustrating operation of a pump for generating negative pressure.
Figure 2:
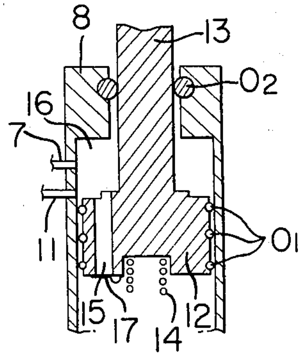
Figure 3:
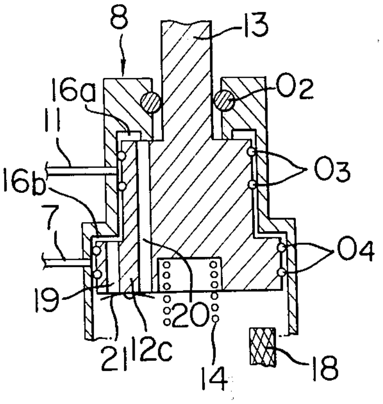
FIGS. 3 and 4 each are vertical side views illustrating operation of an embodiment according to the present invention.
Figure 4:
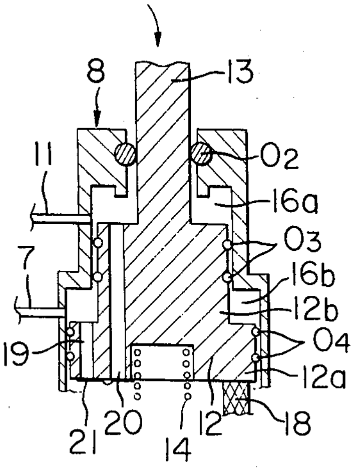
Figure 5:
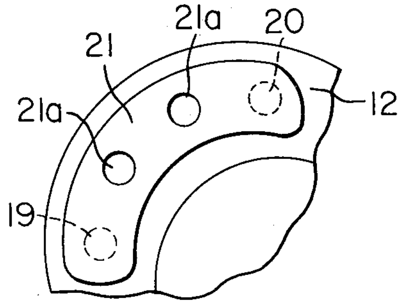
FIG. 5 is a partially enlarged bottom plan view showing a fitting construction of valves.

FIGS. 3–5 show an embodiment according to the present invention. The same reference numerals as in FIGS. 1 and 2 are used to denote identical or corresponding parts and the description thereof omitted.

In the present embodiment, a piston 12 of a pump 8 possesses a step construction comprising a large diameter portion 12*a* and a small diameter portion 12*b*. A cylinder correspondingly possesses a step construction comprising large and small diameter portions. Two suction chambers 16*a* and 16*b* are formed by the above-mentioned step construction. Each of the suction chambers 16*a* and 16*b* is sealed by an O-ring $O_3$ and $O_4$, respectively, and each is independent of the other. The lowest limit of the piston 12 is limited by a stopper 18 so that the two suction chambers cannot intercommunicate. The large diameter portion 12*a* and the small diameter portion 12*b* of the piston 12 are provided with discharge holes 19 and 20, respectively, to communicate to the suction chambers 16*b* and 16*a*, respectively. A tube 11 communicates between the suction chamber 16*a* and a nozzle unit 1. A tube 7 communicates between the suction chamber 16*b* and a sub-tank 2. Pins 21*a* fix a valve 21 of polyester film of about 50μ thickness on a partition wall 12C between the discharge holes 19 and 20 so that the free end of the valve 21 can face the low ends of the discharge holes 19 and 20.

Next, the action of the present embodiment mentioned above will be explained.

When the pump 8 is present in the non-operation state, the piston 13 is present at the highest limit and the volumes of the suction chambers 16*a* and 16*b* are at their minimum. When the action for improving poor discharge of ink is started from the above-mentioned non-operation state, the piston 13 is pressed downwards as shown in FIG. 4 to make the volumes of the suction chambers 16*a* and 16*b* maximum and the valve 21 is closed. Therefore, negative pressures are generated in the suction chambers 16*a* and 16*b*, respectively. The negative pressures are independently led to the nozzle unit 1 and the sub-tank 2 to suck air and ink, respectively, improving poor discharge.

When a liquid surface of an ink in the sub-tank 2 is located lower than the ink-supplying port 3 as shown by the sign $H_2$ in FIG. 1, the degree of negative pressure of the suction chamber 16*b* is lessened. However, even when the degree of negative pressure is lessened to about $\frac{1}{3}$ regarding suction of air only, the liquid surface of the ink in the sub-tank can be easily raised because of an extremely small negative pressure resistance of air flow regarding suction of air only in comparison with that of ink flow. In this case, balance of pressure is caused in the following way. The negative pressure generated in the inside of the sub-tank 2 driving suction easily supplies an ink in a main tank 5 to the sub-tank 2 because of small fluid friction in the flow path from the main tank 5 to the sub-tank 2. In this case, since the suction chamber 16*a* holds negative pressure independent of the suction chamber 16*b*, ink is sufficiently sucked and the suction chamber 16*a* approaches atmosphere to improve poor discharge.

After completion, thereby improving poor discharge, the pressing force applied to the piston 12 is removed so that the piston 12 is raised by a spring 14 to make the insides of the suction chambers 16*a* and 16*b* atmospheric without raising the pressure by opening of the valve 21. Since resistances of the discharge holes 19 and 20 are less 1/10 in comparison with those of tubes 7 and 11, a coupling portion between the pump 8 and a tube, and the like, the discharge holes 19 and 20 can easily escape the pressure generated during the return of the piston 12.

As clear from the above-mentioned explanation, since an ink jet apparatus according to the present invention is provided with at least two suction chambers independent of each other, each of which separately has a nozzle and a sub-tank, this apparatus sucks air and ink in a sub-tank and a nozzle, respectively. Therefore, the otherwise poor discharge of ink is improved.

In addition, the number of the suction chambers is not limited to two even, though there is not shown in the drawings herein a figure having the number of suction chambers of more than two. Further, the purpose of the present invention can also be attained by a pump having additionally suction chambers (namely, a pump having suction chambers of three or more).

What we claim is:

1. An ink jet apparatus comprising an ink jet nozzle, a cap capable of fitting said ink jet nozzle, and a suction means for supplying negative pressure to the ink jet nozzle and an ink-storage vessel in communication with said ink jet nozzle, wherein said suction means is provided with at least two independent suction chambers with at least one of the suction chambers being in communication with the ink-storage vessel, and with at least the other suction chamber being in communication with said cap.

2. An ink jet apparatus according to claim 1, wherein said suction means is a pump.

3. An ink jet apparatus according to claim 2, wherein said pump is provided with a cylinder and a piston which comprise stepwise portions having different diameters.

4. An ink jet apparatus according to claim 1, wherein said suction chambers are constructed so that each is in communication with the atmosphere through a separate valve.

* * * * *

UNITED STATES PATENT AND TRADEMARK OFFICE

CERTIFICATE OF CORRECTION

PATENT NO. : 4,403,233

DATED : September 6, 1983

INVENTOR(S) : KOJI TERASAWA, ET AL.

It is certified that error appears in the above-identified patent and that said Letters Patent is hereby corrected as shown below:

On the front page for the Foreign Application Priority Data, the application "56-5601" should be --56-15601--.

Column 1, line 13, change "or" (second occurrence) to --as--;

line 31, delete "for".

Column 2, line 44, change "fitting to" to --fitting--.

Signed and Sealed this

*Thirteenth* Day of *March 1984*

[SEAL]

*Attest:*

GERALD J. MOSSINGHOFF

*Attesting Officer* *Commissioner of Patents and Trademarks*